United States Patent [19]

Eaton

[11] Patent Number: 4,989,547
[45] Date of Patent: Feb. 5, 1991

[54] LIQUID AND SOLID DISPENSER APPARATUS AND METHOD

[76] Inventor: Mark Eaton, 143 Casa Loma Ci., Georgetown, Tex. 78628

[21] Appl. No.: 344,762

[22] Filed: Apr. 28, 1989

[51] Int. Cl.⁵ .............................................. A01K 5/00
[52] U.S. Cl. .................................. 119/51.11; 222/187
[58] Field of Search ............... 119/51.11, 51.13, 51.01, 119/51.04; 222/187; 239/662, 229, 418

[56] References Cited

U.S. PATENT DOCUMENTS

| | | | |
|---|---|---|---|
| 3,331,357 | 7/1967 | Legrain et al. | 119/51.11 |
| 3,561,403 | 2/1971 | Wilson, Jr. et al. | 119/51.11 |
| 3,955,537 | 5/1976 | Yujiri | 119/51.13 |
| 4,256,054 | 3/1981 | Hitchcock | 119/51.11 |
| 4,640,229 | 2/1987 | Swartzendruber | 119/51.11 |
| 4,771,734 | 9/1988 | Blicher | 119/51.11 |

*Primary Examiner*—Gene Mancene
*Assistant Examiner*—R. Thomas Price
*Attorney, Agent, or Firm*—J. Nevin Shaffer, Jr.

[57] ABSTRACT

A liquid and solid dispenser apparatus and method having a motor, a timer, a feed dispenser and a scent dispenser. The liquid dispenser of one embodiment utilizes suction created on the hollow motor shaft and a hollow shaft extension, extending into a scent dispenser filled with scent, once the outlets begin to spin by way of operation of the motor and the motor shaft, so that centrifugal force dispenses scent from the outlets and draws the fluid through the shaft. As a result, scent is deposited on feed which are both dispersed at the same time. Another embodiment utilizes a torus shaped ring for containing scent attached to the top of the motor shaft, thereby eliminating the shaft extension. As the torus shaped dispenser is rotated the scent is mixed and is dispersed through flow plugs. Depending on the size of the removable attachable flow plugs used, more or less scent can be disbursed by this method. This embodiment has the advantage of creating a vacuum inside the dispenser that sucks air back into it and cleans the plugs once the operating cycle is completed. A further embodiment utilizes wicks instead of flow plugs so that scent is dispensed immediately upon rotation and additionally, when not rotating, scent in small amounts is dispensed on a continuous basis.

15 Claims, 3 Drawing Sheets

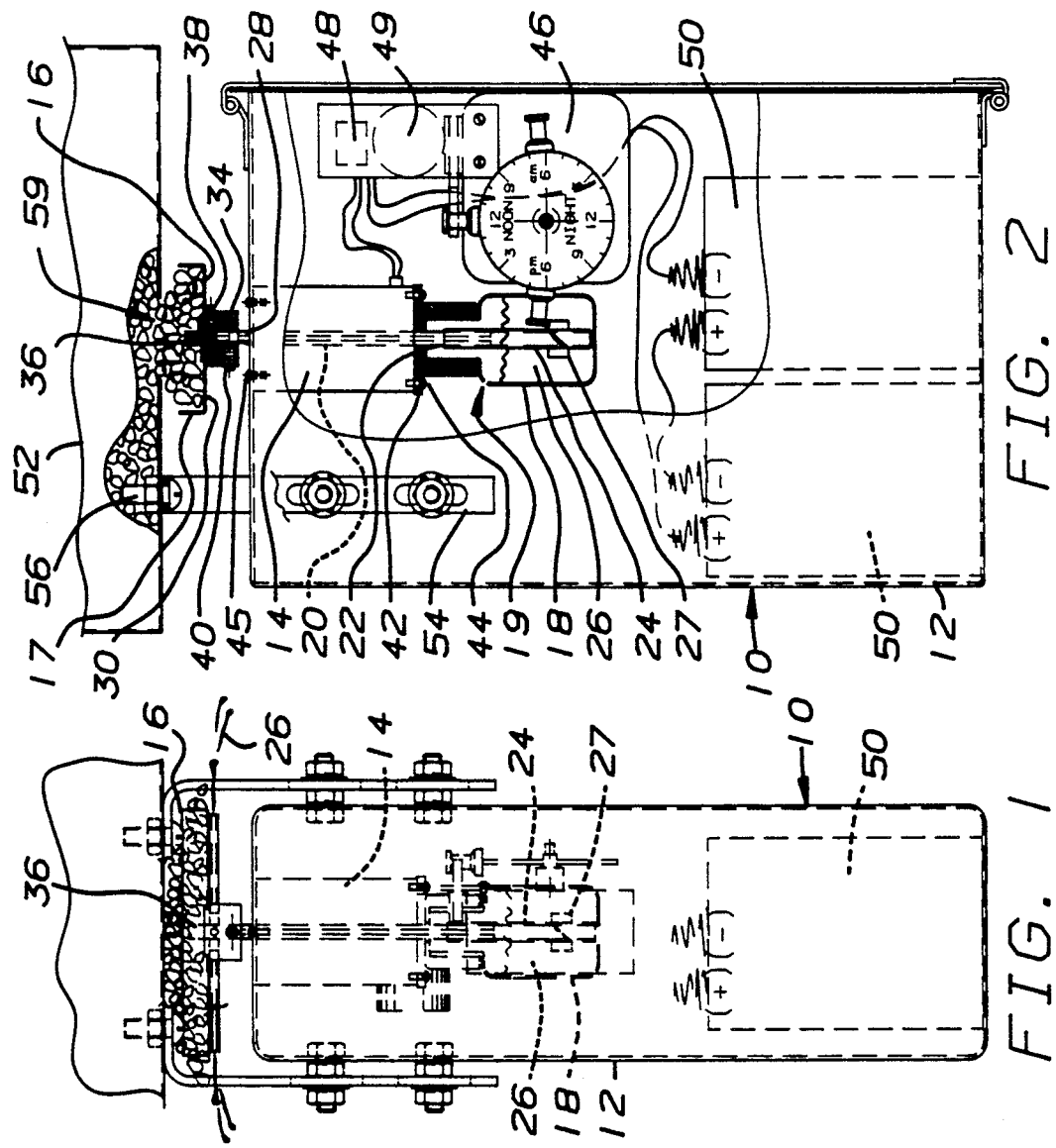

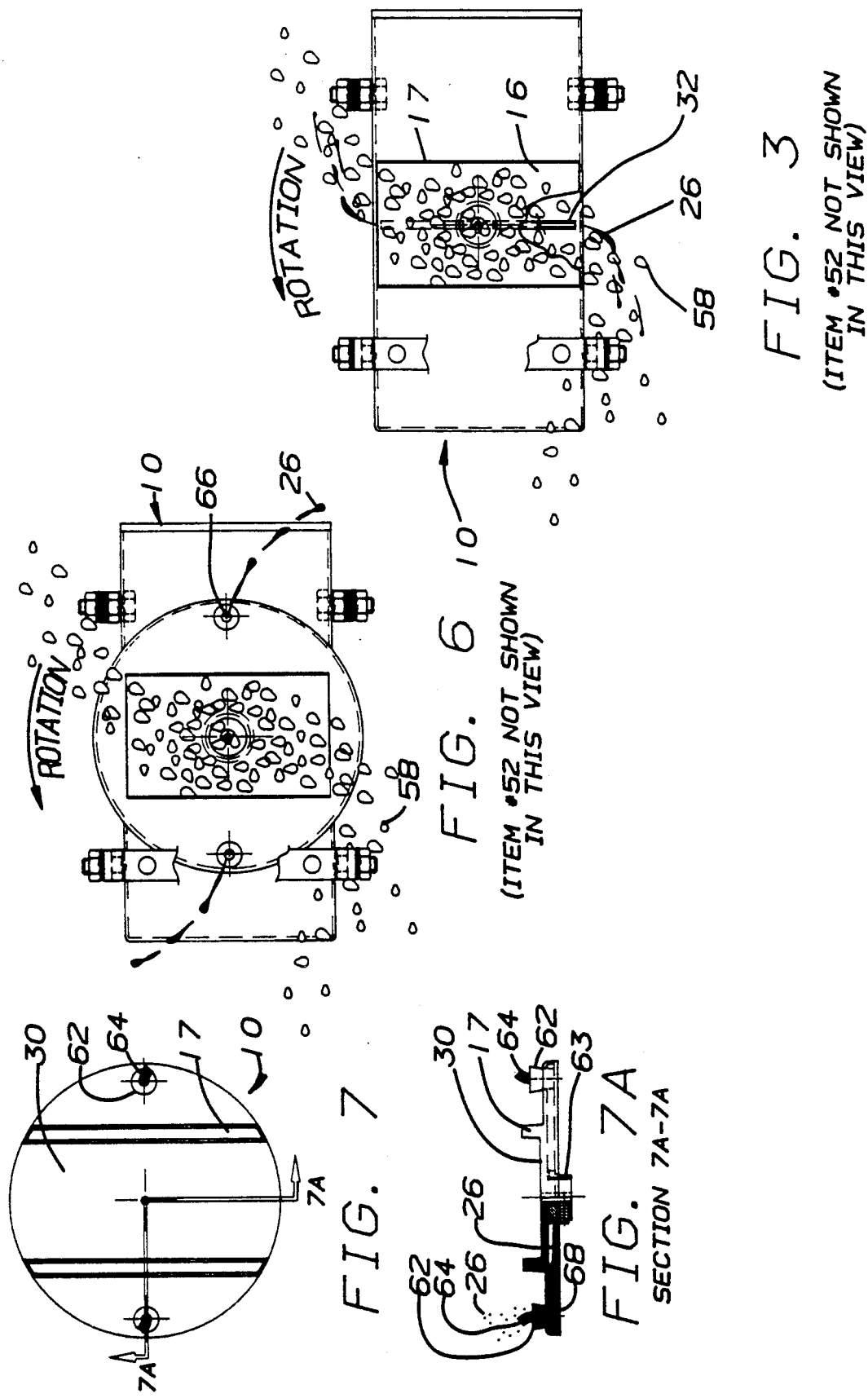

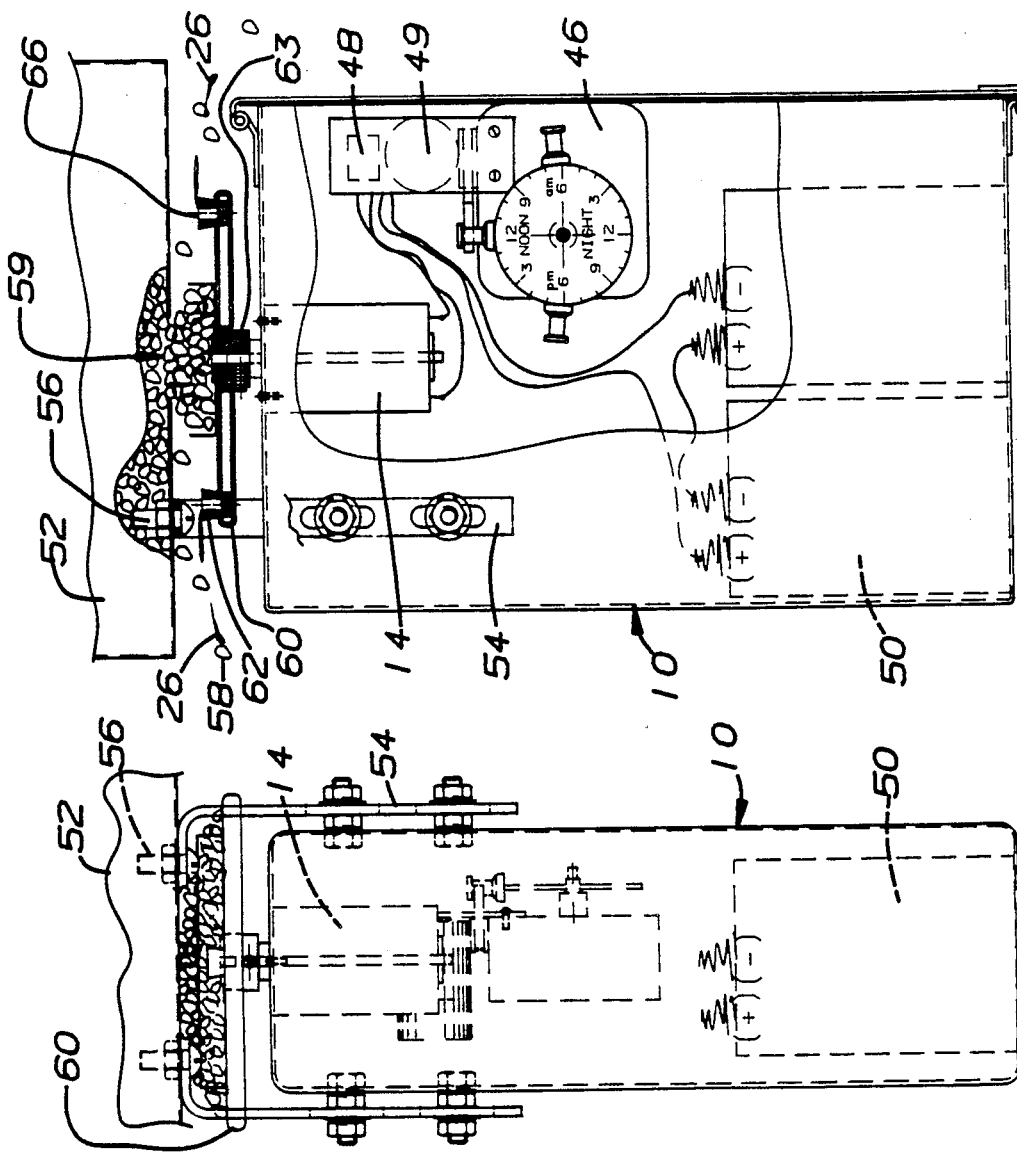

LIQUID AND SOLID DISPENSER APPARATUS AND METHOD

BACKGROUND OF THE INVENTION

This invention relates to an improved liquid and solid dispenser apparatus and method.

For years deer hunters have had a persistent challenge of luring the elusive mature buck to a wildlife feeder at feeding time. If the hunter adjusts his wildlife feeder to broadcast early morning and late afternoon, which is the normal feed time for deer, he will probably have a good chance of seeing deer. The mature bucks will often feed at night or not at all from the "wildlife feeder" if they sense the presence of man in their habitat. However, during deer mating (rutting) season a buck will follow his primal instincts and chase a doe, if he smells her scent, and not worry about his own safety.

Both manual and automatically driven feed dispensers have been known in the art for quite some time. The application of scent in the area of the feed and on the feed itself is also known. An example of a wild life feeder is disclosed in Wentworth, U.S. Pat. No. 3,780,701 which utilizes an elongated rod to control the dispensing of feed and which prohibits the dispensing of the entire feed supply when the activating device is maintained in one position. Automatic feeding devices for animals are also known in the art as exemplified by Crippen, U.S. Pat. No. 3,742,913, North, U.S. Pat. No. 3,827,404, and Ruth, U.S. Pat. No. 3,678,902. Each of these patents utilize timers to activate the feeders intermittently. Crippen discloses a rotating turntable having a cone-shaped dispersing means centrally thereof positioned underneath the compartment containing feed to receive feed discharged from the container and to distribute the feed outwardly 6 to a feed trough surrounding the turntable. Ruth discloses a timed animal feeder which is responsive to sunrise and sunset in which feed slides out a shoot in response to the operation of the timer. Ruth also discloses a water container with a spigot for dispensing water at the same time grain is dispensed.

Other feeders that also water or add moisture to feed are also known in the art as exemplified by Cawecki, U.S. Pat. No. 3,527,191 and Geerlings, U.S. Pat. No. 3,547,081. Cawecki discloses an automatic, stable, pet feeding and watering device that dispenses food and water at pre-determined intervals, and that is stable against being accidentally turned over by the feeding pet. Geerlings discloses a feeder for supplying feed for animals and for adding moisture thereto without excess and thereafter removing the moist feed from the moistening area and depositing the same in a feeding area for consumption by the animals with or without additional moisture added.

A drawback to the feeders known in the art is that no provision is made for the addition of a lure to attract animals to the feed. None add a scent to the feed that is distributed and those that dispense water along with the feed would be ill equipped to provide the scent to those mechanically complicated dispensing mechanisms should this new use be attempted. In this regard, the metering devices known to the art are mechanically complicated and are neither self metering nor self-cleaning. Thus, there is a need in the art for providing a simultaneous scent and feed dispenser which automatically dispenses scent through a mechanically simple self metering, self cleaning valve so that a lure enhancement is added to the feed at the time feed is dispensed. It, therefore is an object of this invention to provide an improved feeding mechanism, such as the wild life feeder, for simultaneously adding a lure enhancement as the feed is dispensed.

SHORT STATEMENT OF THE INVENTION

Accordingly, the liquid and solid dispenser of the present invention includes a frame having a solid dispenser and a liquid dispenser therein which are moved by means of a motor. A timer is connected to the motor so that the motor is alternately turned on and off at pre-determined intervals. The solid feed dispenser comprises a base plate with side walls forming an enclosure for feed and the liquid, scent, dispenser comprises a scent container connected to a dispensing plate. In one embodiment, the dispensing plate provides the top cover for the feed dispenser so that feed is disbursed over the side walls and under the scent dispensing plate. In this embodiment, scent is dispensed by means of a flow valve at the same time feed is dispensed so that scent and feed are mixed. In another embodiment, the scent dispenser comprises a torus shaped container with one or more flow plugs. In this embodiment, scent is distributed at the same time feed is distributed by means of centrifugal force acting on the container as in the previous embodiment. In this embodiment, however, scent is mixed and agitated as it is dispensed. The flow valves of the invention are simple, removable valves that can be of various dimensions for allowing various amounts of scent to be distributed per operating period. Additionally, they are designed to be self cleaning in that when at rest gravity acts to pull the scent away from the valve and air follows the retreating scent so that the valve is cleaned and ready for subsequent use while at rest. Another important feature of the liquid and solid dispenser is the fact that many other scents can be substituted for doe scent. The hunter, farmer, zoo keeper, etc., may want to enhance the flavor or aroma of the feed he dispenses.

BRIEF DESCRIPTION OF THE DRAWINGS

Other objects, features and advantages of the present invention will become more fully apparent from the following detailed description of the preferred embodiment, the appended claims and the accompanied drawings in which:

FIG. 1 is a side view of the preferred embodiment of the scent and feed dispenser of the present invention;

FIG. 2 is a front view of the invention in FIG. 1;

FIG. 3 is a top view of the invention in FIG. 1 and 2 with primary feed dispenser removed;

FIG. 4 is a side view of another embodiment of the invention with a torus shaped scent container;

FIG. 5 is a front view of the invention in FIG. 4;

FIG. 6 is a top view of the invention in FIGS. 4 and 5 with primary feed dispenser removed; and FIG. 7 is a top view of a third environment using a wick for drawing scent from a scent container; and FIG. 7A is a side sectional view taken along lines A-A of FIG. 7.

DETAILED DESCRIPTION OF THE PREFERRED EMBODIMENT

The preferred embodiment of the preferred invention is illustrated by way of example in FIGS. 1–7A. With specific reference to FIGS. 1, 2 and 3, a scent and feed dispenser 10 includes a frame 12, motor 14, a secondary feed container 16, and a scent dispenser 18. Motor shaft 20 connects feed container 16 and scent dispenser 18. A breather hole 19 is provided in dispenser 18 to allow air pressure to equalize within the dispenser. One end 22 of motor shaft 20 is connected to shaft extension 24, which extends into scent dispenser 18, containing scent 26. A mixing fin 27 is attached to extension 24 so that as the shaft and extension rotate, scent 26 is mixed. The other end 28 of motor shaft 20, is connected to secondary feed container 16 and scent dispensing plate 30. In this embodiment, scent dispensing plate 30 has radial outlets 32 connected by means of the hollow motorshaft 20 and hollow shaft extension 24 to scent 26 in scent dispenser 18. Secondary feed container 16 has raised sides 17 that serve to contain feed. Further, motor shaft end 28 is connected to scent dispensing plate by means of manifold hub 34. Manifold hub 34 has flow valve 36 which is adjustable for allowing more or less scent to radial outlets 32 by movement up or down and which is held in position by set screw 38. Manifold hub 34 is held in position by manifold hub set screw 40. Scent dispenser 18 is connected to, and suspended from, motor 14 by means of bracket 42 and screws 44 or the like.

Scent and/or feed dispenser 10 also includes a timer 46 and relay circuit 48 connected to motor 14, known in the art and not disclosed further hereafter. Electric power for timer 46, relay circuit 48 and motor 20 is provided by 6 volt DC batteries 50 or any other power source known in the art, such as solar power for instance. A height adjustable primary feed container 52 contains feed to be dispensed and provides a cover for feed container 16. Height adjuster 54 is attached to frame 12 and to feed container 52 by bolts 56, and the like.

In operation, this embodiment of a simultaneous liquid and solid dispenser 10 operates as follows:

Feed is loaded into primary feed dispenser 52 and scent 26 into dispenser 18. Timer 46, set to engage relay circuit 48 to energize electric motor 14, operates at predetermined periods of time. When motor 14 is energized, motor shaft 20 is rotated thereby rotating shaft extension 24, secondary feed container 16 and scent dispensing plate 30. Centrifugal force forces feed 58 out of and away from feed container 16 underneath primary feed container 52. Additionally, the rotation of hollow motor shaft 20 and shaft extension 24 causes a suction on scent 26 in scent dispenser 28 thereby drawing scent up the hollow shaft to flow valve 36 and manifold hub 34. At that point, the amount of scent is regulated and a regulated amount of scent is disbursed from radial outlets 32. At this point, scent 26 and feed 58 are mixed. As feed is dispensed from secondary feed container 16, feed is released from a hole 59 in the bottom of primary feed container 52 so that secondary feed container 16 is continuously filled by gravity.

When the desired time period for operation has elapsed, timer 46 disengages relay circuit 48, and capacitor 49, and motor 14 is stopped. As a result, feed container 16 and feed dispenser 18 stop rotating and feed and scent are no longer dispensed. Gravity aids in the self cleaning aspect of the invention so that as scent contained in hollow shafts 20 and 24 returns to scent dispenser 18 air follows and cleans radial outlets 32, manifold 34, flow valve 36 and the shafts. As a result, the device is self cleaning and ready for utilization at the next operating period. This system also forms a vacuum, as in the alternate preferred embodiment, when breather hole #19 is plugged. It is important to note that it is possible that this device could be used solely for scent dispensing if desired.

Referring now to FIGS. 4, 5 and 6, an alternate preferred embodiment is disclosed. As shown in FIGS. 4 and 5, a torus shaped dispenser 60 is provided. Dispenser 60 is attached to motor shaft 20. Dispenser 60 holds scent 26 for disbursal through flow plugs 62. In this embodiment, the amount of scent is regulated by the utilization of various sizes of flow plugs 62, which are removably attachable to torus shaped dispenser 60. Further, in this embodiment, the rotation of motor shaft 20, when energized, 7 causes centrifugal force to act directly upon scent 26 rather than upon the air through hollow shafts as described above. This has the advantage of providing scent immediately upon rotation of motor shaft 20 rather than a more delayed application of scent in the previous embodiment because the initial suction is taken on an empty hollow shaft. A further advantage is that scent contained in torus shaped dispenser 60 is agitated and mixed prior to and during disbursement, without need of mechanical fins 27, so that should the scent have the tendency to separate, this tendency would be overcome and the scent would be mixed prior to dispersal. The plug or plugs 62 is designed to be self cleaning in that when the feeding cycle is completed a vacuum is formed from the loss of liquid scent. This results in the forced entry of air through the orifice 66 in the plug to fill the void left from the centrifugal dispensing of liquid scent. The plug 62 is also used as a filler port for the scent 26 and also a mixing device inside the torus shaped container 60 at initial start up. That is, scent 26 impacts base 68 as the container 60 is spun around. As container 60 spins, equilibrium is achieved when the centrifugal force which releases the scent equals the vacuum force (which is created by the loss of fluid mass) holding the liquid in the dispenser. At that time, the liquid scent 26 stops dispensing through the plug orifice 66 and an amount of scent commensurate to the pre-determined size of orifice 66 is dispensed and no more. If breather hole 63 is opened, equilibrium is not achieved and the liquid will continue to flow until the feed cycle is completed. The person operating 7 the feed and scent dispenser decides how he wishes to meter the flow. He can also control the amount of flow by using various size orifice plugs as previously mentioned.

Referring now to FIGS. 7 and 7A, another embodiment of scent and feed dispenser 10 is shown wherein, a wick 64 is added to the flow plug 62. The advantage of wick(s) 64 in this embodiment is that fluid in scent 26 is continually dispersed and dispensed to the atmosphere even when not rotating. Further, scent 26 is even more readily available for dispersement upon the initiation of an operating period by timer 46. In this embodiment then, scent 26 is dispersed, along with feed if present, during the operating period after the wick is primed by rotation and scent continues to be gradually and gently dispersed by means of wick(s) 64 during non-operating periods so that a constant attractive lure is present at all times.

In each of the embodiments, no mechanically complicated valves are utilized. As a result, these embodiments have the advantage over the prior art in being simple and easily maintained. Further they have the advantage of being self-metering and self-cleaning. It should be understood that this is a liquid and solid dispenser generally that could be used with a variety of liquids and semiliquids such as oil and tar and solids such as gravel.

While the present invention has been disclosed in connection with the preferred embodiment thereof, it should be understood that there may be other embodiments which fall within the spirit and scope of the invention as defined by the following claims.

What is claimed is:

1. A liquid and solid dispenser mechanism comprising
   A. a frame;
   B. a motor means mounted on said frame;
   C. a solid dispenser means;
   D. a liquid dispenser means;
   E. a means interconnecting said solid dispenser means and said liquid dispenser means for rotating said solid dispenser means and liquid dispenser means when said motor means is operating so that solids and liquids are dispensed;
   F. a timer means connected to said motor means so that said motor is alternately turned on and off at pre-determined intervals;
   G. said solid dispenser means comprising a primary dispenser containing stored solids and a secondary dispenser with a base plate and sidewalls, said sidewalls being fixedly secured to said base plate, said secondary dispenser base plate and sidewalls forming an enclosure for holding said solids prior to rotation;
   H. said liquid dispenser means comprising a liquid container, and said secondary dispenser base plate with at least one radial outlet, said liquid container and secondary dispenser base plate connected by said interconnecting means wherein said interconnecting means is a hollow shaft so that as said shaft is rotated liquid is drawn through said shaft and is dispensed from said radial outlet; and
   I. a liquid flow valve attached to said shaft so that the flow of liquid is regulated.

2. The mechanism of claim 1 wherein said primary dispenser is located above said secondary dispenser base plate and side walls a distance from said side walls so that stored solids are dispensed between said side walls and onto said dispensing plate and held behind said sidewalls prior to rotation of said dispensing plate and so that liquid is deposited on said solids when said motor is operating.

3. The mechanism of claim 1 wherein said liquid dispenser means comprises:
   A. a torus shaped container for holding liquid; and
   B. removably attachable self-metering, self-cleaning flow plug means in said torus shaped container so that when said motor is operating liquid is dispensed and when said motor stops operating air is sucked into said container through said flow plug means cleaning it for future use.

4. The mechanism of claim 3 wherein said torus shaped container is located below said solid dispenser means so that when said motor is operating liquid is deposited from below on said solids.

5. The mechanism of claim 1 wherein said liquid dispenser means comprises:
   A. a flow plug; and
   B. a wick in said flow plug so that liquid is continuously dispensed while at rest and while rotating.

6. The dispenser of claim 1 wherein said solids are feed and said liquids are scent.

7. The dispenser of claim 1 wherein said solids are gravel and said liquid is oil and tar.

8. A liquid and solid dispenser method comprising the steps of:
   A. constructing a frame;
   B. mounting a motor means on said frame;
   C. providing a solid dispenser means;
   D. providing a liquid dispenser means;
   E. interconnecting said solid dispenser means and said liquid dispenser means so that said solid dispenser means and liquid dispenser means are rotated when said motor means is operating;
   F. placing solids in said solid dispenser means;
   G. placing liquid in said liquid dispensing means;
   H. connecting a timer means to said motor means so that said motor is alternately turned on and off at predetermined intervals and said solids and liquids are dispensed when said motor is on;
   I. the step of providing said solid dispenser means further comprising the steps of constructing a primary dispenser containing stored solids and a secondary dispenser with a base plate and sidewalls, said sidewalls fixedly secured to said secondary dispenser base plate so that said baseplate and said sidewalls form an enclosure for retaining said solids prior to rotation;
   J. the step of providing said liquid dispenser means further comprising the steps of constructing a liquid container;
   K. constructing said secondary dispenser base plate with at least one radial outlet, said liquid container and secondary dispenser base plate then connected by an interconnecting means wherein said interconnecting means is a hollow shaft so that as said shaft is rotated liquid is drawn through said shaft and dispensed from said radial outlet; and
   L. attaching a liquid flow valve to said shaft so that the flow of liquid is regulated.

9. The method of claim 18 wherein providing said liquid dispenser means comprises the steps of:
   A. attaching at least one flow plug to said dispenser; and
   B. placing a wick in said flow plug so that scent is continuously dispensed even without movement.

10. The method of claim 8 wherein constructing said secondary dispenser base plate comprises the step of attaching said primary solid dispenser so that said primary solid dispenser is located above said secondary dispenser base plate and sidewalls a distance from said sidewalls so that solids are dispensed between said sidewalls and onto said secondary dispenser base plate and held behind said sidewalls prior to rotation of said secondary dispenser base plate and so that liquid is deposited on said solids when said motor is operating.

11. The method of claim 10 further comprising the step of locating said torus shaped container below said solid dispenser means so that when said motor is operating scent is deposited from below on said feed.

12. The method of claim 8 wherein providing said liquid dispenser means comprises the steps of:
   A. constructing a torus shaped container for holding liquid; and
   B. inserting removably attachable, self-metering, self-cleaning flow plug means in said torus shaped container so that when said motor is operating liquid is dispensed and when said motor stops operating air is sucked into said container through said flow plug means, cleaning it for future use.

13. The method of claim 12 wherein providince said liquid dispenser means comprises the further step of constructing a breather hole in said torus shaped container so that fluid is continuously dispensed while said torus shaped container is moving since a vacuum is relieved by said breather hole.

14. The method of claim 8 wherein said solids are feed and said liquids are scent.

15. The method of claim 8 wherein said solids are gravel and said liquid is oil and tar.

* * * * *